United States Patent
Shambaugh et al.

(10) Patent No.: US 7,151,826 B2
(45) Date of Patent: Dec. 19, 2006

(54) THIRD PARTY COACHING FOR AGENTS IN A COMMUNICATION SYSTEM

(75) Inventors: Craig R. Shambaugh, Wheaton, IL (US); Roger A. Sumner, Batavia, IL (US); Mark J. Power, Carol Stream, IL (US); Carlo Bonifazi, Woodridge, IL (US); Jeffrey D. Hodson, Wheaton, IL (US); Mark J. Michelson, Elburn, IL (US); Robert P. Beckstrom, Bolingbrook, IL (US); Anthony J. Dezonno, Bloomingdale, IL (US)

(73) Assignee: Rockwell Electronics Commerce Technologies L.L.C., Wood Dale, IL (US)

( * ) Notice: Subject to any disclaimer, the term of this patent is extended or adjusted under 35 U.S.C. 154(b) by 170 days.

(21) Appl. No.: 10/259,356

(22) Filed: Sep. 27, 2002

(65) Prior Publication Data

US 2004/0062363 A1    Apr. 1, 2004

(51) Int. Cl.
   *H04M 3/00*    (2006.01)
(52) U.S. Cl. .................... 379/265.02; 379/265.06; 379/265.07
(58) Field of Classification Search ........... 379/265.07, 379/265.02, 309, 265.06
See application file for complete search history.

(56) References Cited

U.S. PATENT DOCUMENTS

| | | | |
|---|---|---|---|
| 4,638,445 A * | 1/1987 | Mattaboni .................. 701/23 |
| 4,692,941 A * | 9/1987 | Jacks et al. ................. 704/260 |
| 4,952,928 A * | 8/1990 | Carroll et al. ............ 340/10.41 |
| 5,289,375 A * | 2/1994 | Fukumochi et al. ........... 704/2 |
| 5,555,179 A | 9/1996 | Koyama et al. |
| 5,765,033 A | 6/1998 | Miloslavsky |
| 5,872,834 A * | 2/1999 | Teitelbaum ............... 379/93.03 |
| 5,926,539 A | 7/1999 | Shtivelman |
| 5,946,387 A | 8/1999 | Miloslavsky |
| 5,953,332 A | 9/1999 | Miloslavsky |
| 5,953,405 A | 9/1999 | Miloslavsky |
| 6,002,760 A | 12/1999 | Gisby |
| 6,021,428 A | 2/2000 | Miloslavsky |
| 6,044,145 A | 3/2000 | Kelly et al. |

(Continued)

OTHER PUBLICATIONS

Science + Technology In Congress, Dec. 2000, "Do Polygraphs Work?" by Matthew Zimmerman, p. 7.*

(Continued)

*Primary Examiner*—Bing Q. Bui
(74) *Attorney, Agent, or Firm*—Welsh & Katz, Ltd.

(57) ABSTRACT

The method and apparatus improve transactions in a communication system, such as a communication system having an automatic call distributor. In one embodiment, an assessment is performed in substantially real time of respective stress levels of at least one of a caller and an agent in a call transaction. A third party is engaged in the transaction when at least one of the stress levels of the caller and the agent exceeds a threshold. This third party may include, for example, a virtual party or an automated input source. The third party may engage in the background of the transaction or in the foreground of the transaction, thus communicating either only with the agent or with both the caller and the agent, respectively. The respective stress levels of at least one of the caller and agent may be assessed by methods which include, but are not limited to; analyzing a respective voice signal of at least one of the caller and the agent, converting a respective voice signal of least one of the caller and the agent to text and analyzing the text and/or analyzing a physical stress level of the agent. The apparatus implements the method.

31 Claims, 5 Drawing Sheets

U.S. PATENT DOCUMENTS

| | | | |
|---|---|---|---|
| 6,044,368 A | 3/2000 | Powers | |
| 6,055,307 A * | 4/2000 | Behnke et al. | 379/265.14 |
| 6,058,435 A * | 5/2000 | Sassin et al. | 719/331 |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,345,305 B1 | 2/2002 | Beck et al. | |
| 6,363,145 B1 * | 3/2002 | Shaffer et al. | 379/265.02 |
| 6,373,836 B1 | 4/2002 | Deryugin et al. | |
| 6,389,007 B1 | 5/2002 | Shenkman et al. | |
| 6,393,015 B1 | 5/2002 | Shtivelman | |
| 6,404,857 B1 * | 6/2002 | Blair et al. | 379/67.1 |
| 6,600,821 B1 * | 7/2003 | Chan et al. | 379/265.07 |
| 6,724,887 B1 * | 4/2004 | Eilbacher et al. | 379/265.03 |
| 6,732,156 B1 | 5/2004 | Miloslavsky | |
| 2002/0091813 A1 * | 7/2002 | Lamberton et al. | 709/223 |
| 2002/0107844 A1 * | 8/2002 | Cha et al. | 707/3 |
| 2002/0109595 A1 * | 8/2002 | Cairo et al. | 340/573.1 |
| 2003/0217024 A1 * | 11/2003 | Kocher | 706/47 |
| 2004/0015450 A1 * | 1/2004 | Zingher et al. | 705/64 |

OTHER PUBLICATIONS

Rob Kall, Psychophysiological Stress Profiling, 1995, p. 1.*

* cited by examiner

THIRD PARTY COACHING FOR AGENTS IN A COMMUNICATION SYSTEM

BACKGROUND

The field of the invention relates to communication systems and, in particular, to communication systems having automatic call distributors.

Automatic call distribution systems are known. Such systems are typically used, for example, within private branch telephone exchanges as a means of distributing telephone calls among a group of agents. While the automatic call distributor may be a separate part of a private branch telephone exchange, often the automatic call distributor is integrated into and is an indistinguishable part of the private branch telephone exchange.

Often an organization disseminates a single telephone number to its customers and to the public in general as a means of contacting the organization. As calls are often directed to the organization from the public switch telephone network, or, the communications network (e.g. the Internet) automatic call distribution system directs the calls to its agents based upon some type of criteria. For example, where all agents are considered equal, the automatic call distributor may distribute the calls based upon which agent has been idle the longest. The agents that are operatively connected to the automatic call distributor may be live agents, and/or virtual agents. Typically, virtual agents are software routines and algorithms that are operatively connected and/or part of the automatic call distributor.

Automatic call distributors are utilized in communications handling centers, such as call centers, that forward incoming communications, such as telephone calls, or other contacts for processing by one of several associated call-handling agents. The term "call" refers herein to any suitable communications including but not limited to, voice-over-Internet protocol communications; electronic mail messages; facsimiles, chat room dialog, instant messages, other Internet contacts. An automatic call distributor is any system which performs the functions of automatically distributing calls to agents while typically maintaining records of the call processing, and may employ a wide variety of architecture made up of software and/or hardware including, for example, integrated centralized systems, distributed systems, systems using one or more personal computers or services, etc.

Telephone call centers, for example, are often used to dispatch emergency services, as telemarketing sales centers, as customer service centers, etc. to automatically distribute received calls. Each incoming call may have a number of handling requirements, depending on, for example, the nature of the call, the originating call area, and the language of the call. Agents, on the other hand, each have abilities to process calls having certain handling requirements. Typically, agents are able to process one or more call types. For example, agents are typically trained to process certain call subject matters and certain call languages.

In some known call centers, computerized automatic call distributors place incoming calls, of a particular type, requiring defined skills, in queues of like calls. Appropriate agents have skills necessary to process calls in the queues, and are assigned to such queues. Agents are often assigned to multiple queues, reflective of their particular handling skills. Typically, this is done to increase the handling capacity of the center by making improved use of available communications handling resources.

Quite often, agents may handle calls related to one or more subject areas, and possess varied attributes that are relevant to all subject areas they are capable of handling. For example, a call center agent may speak multiple languages, and may therefore be able to process calls relating to a particular subject matter in all these languages. One simple approach used to deal with multiple agent attributes is to create and administer individual queues, each of which takes into account the subject matter and the attributes of the agent. This, however, is administratively very cumbersome.

Other known call centers use agent-skill indicators, associated with agents in order to connect calls. In such centers, a call is connected to an agent having an agent-skill indicator matching that of the call, within a group of agents. Agents, however, are typically only assignable to only one, and typically only a single agent-skill indicator is used to connect the call. Disadvantageously, such call centers do not use agent attributes across different groups. This may lead to an inefficient utilization of call center resources. Moreover, these communications handling centers do not allow for easy administration and re-assignment of agents to queues, while maintaining agent skill-sets.

One concern in designing an automatic call distributor system is ensuring that calls are efficiently routed to an agent, so as to minimize the amount of time that any particular call is placed on hold. One basic technique of minimizing on-hold time is to employ a first-in/first-out call handling technique. The first-in/first-out technique requires that calls be routed to the next available agent in the order in which the calls are received. However, in some automatic call distributor systems the agents are specialized in handling particular types of calls, so the first-in/first-out technique is not appropriate. For example in a product support department of a software facility, agents might be grouped according to specialized expertise, so that a first group is knowledgeable in word processing, a second group is knowledgeable in a database program, and a third group is knowledgeable in a spreadsheet program. Utilizing a first-in/first-out technique in such a situation is inappropriate, because a caller with a question regarding the word processing program may be routed to an agent having specialized knowledge regarding the database program or the spreadsheet program, rather than being routed to an agent with specialized knowledge in the word processing program.

The focus in the management of calls has been upon maximizing availability to customers, so as to achieve an acceptable profit margin in a competitive environment of customer service. Call management approaches that increase revenue may lead to savings for customers.

Most present-day call-distribution algorithms focus on being "fair" to callers and to agents. This fairness is reflected by the standard first-in, first-out call to most-idle-agent assignment algorithm. Skills-based routing improves upon this basic algorithm in that it allows each agent to be slotted into a number of categories based on the agent's skill types and levels.

The primary objective of call-distribution algorithms is to ultimately maximize call center performance. That may involve minimizing cost, maximizing call throughput, and/or maximizing revenue, among others. For example, when a new call arrives, the call may be handled by an agent who either has the ability to produce the most revenue or can handle the call in the shortest amount of time. Also, when an agent becomes available to handle a new call, the agent may handle either the call that has the possibility of generating the most revenue or the call that the agent is most efficient in handling.

After the caller has been connected to an agent via the automatic call distributor, for example, as described above, the call transaction between the caller and the agent, especially in the case of telemarketing, may begin to degrade. There may be certain indications or danger points that occur during a call transaction, which would indicate that the relationship between the caller and the agent is degrading. However, the agent may not realize that the transaction is in danger or that either the caller and/or agent has reached an emotional level that is not conducive to achieving a successful conclusion to the call transaction. In other words, either the caller nor the agent or both may reach such a negative emotional level such that a sale is lost. In known systems, it is up to the agent to determine when the emotional level has reached a point at which assistance should be requested. In other words, when a situation arises that is unmanageable; it is the agent's determination as to whether a call should be made for assistance. Thus, it is drawback of known systems, especially in telemarketing, that many sales are lost due to the agent not realizing until it is too late that the caller has become too angry or too emotional to achieve a sale.

Systems that perform voice recording and later analysis by the administrator are not real-time in nature and while they may help improve agent behavior they do not allow improvement during a transaction. The evaluator determines any stress analysis performed on the transaction at the time of listening to the recording and stress levels may be missed. Stress analysis performed during the transaction by an automated process can eliminate the human error component and increase the opportunity to improve the quality of the transaction. The administrator or coach can provide immediate corrective action thereby increasing the opportunity for call success rates. Post event measurement tools offer no opportunity to affect the caller and subsequently the outcome of the call.

Current methods often have the contact center supervisor "plug-in" to an agent to perform coaching and assistance but this limits the coach to only helping one agent. There is thus a need for a method that allows the system to determine the transaction in distress and join the coach to the situation. The coach could be available for many contact center agents simultaneously and may be joined with the individual needing assistance.

SUMMARY

In one embodiment, a method improves transactions in an automatic call distribution system by assessing in substantially real time respective stress levels of at least one of a caller and an agent in a call transaction. A third party is engaged in the transaction when at least one of the stress levels of the caller and the agent exceeds a predetermined threshold. This third party may be a virtual party or an automated input source. The third party may engage in the background of the transaction or in the foreground of the transaction, thus communicating either only with the agent or with both the caller and the agent, respectively. The respective stress levels of at least one of the caller and agent are assessed by at least one of the following: analyzing a respective voice signal of at least one of the caller and the agent, converting a respective voice signal of least one of the caller and the agent to text and analyzing the text, and analyzing a physical stress level of the agent.

In another embodiment, an apparatus for improving call transactions in an automatic call distribution system has a call establishing module that receives a signal from a caller and in response thereto establishes a call transaction between a caller and an agent. A stress assessor is operatively connected to the call transaction. The stress assessor accesses in substantially real time respective stress levels of each of the caller and the agent in the call transaction. An engager is operatively connected to the stress assessor and engages a third party into the transaction when at least one of the stress levels of the caller and the agent exceeds a predetermined threshold.

BRIEF DESCRIPTION OF THE DRAWINGS

The features of the present invention, which are believed to be novel, are set forth with particularity in the appended claims. The invention, together with further advantages, may best be understood by reference to the following description taken in conjunction with the accompanying drawings. In the figures like reference numerals identify like elements.

DETAILED DESCRIPTION

Figure 1:
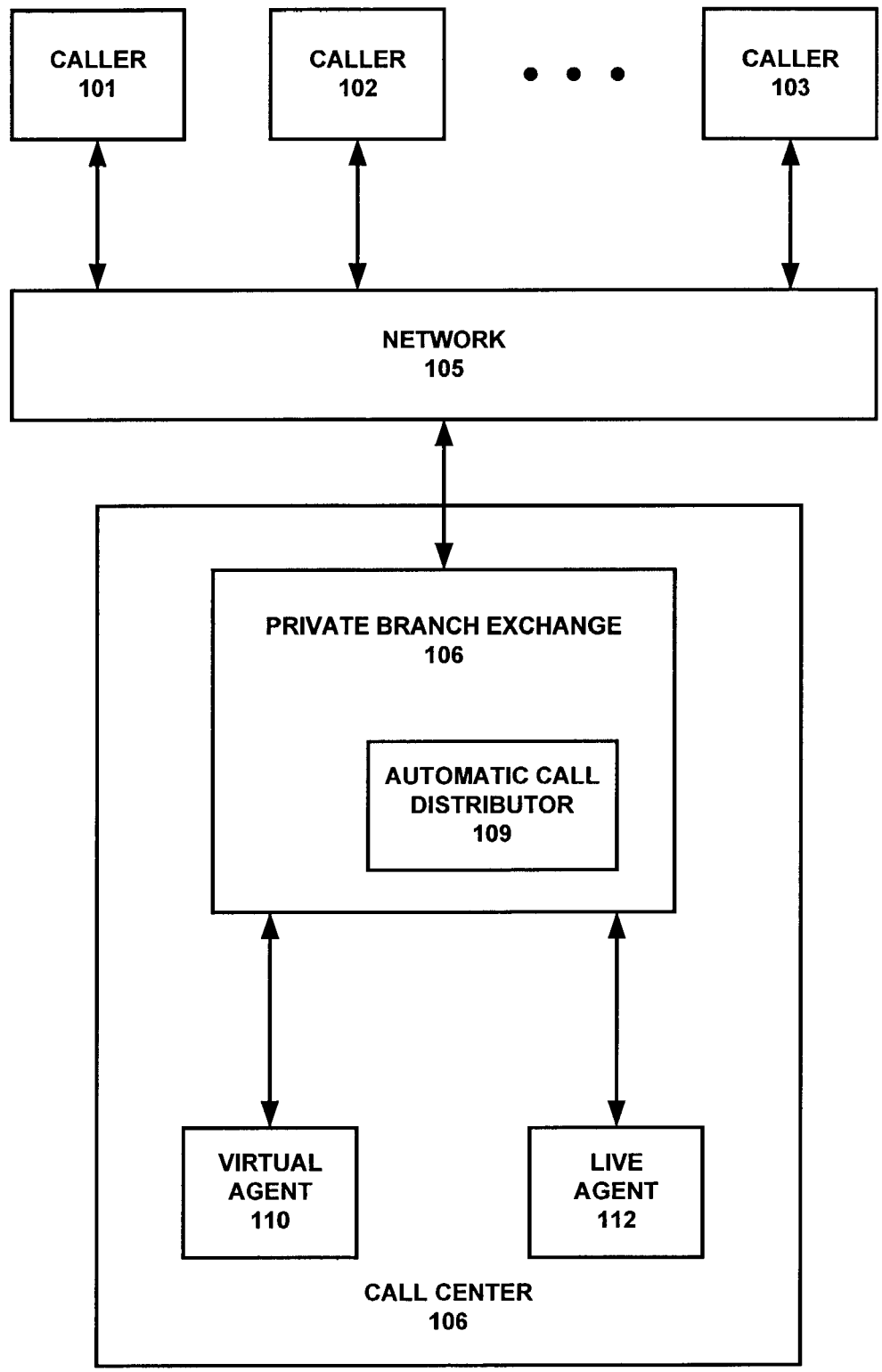
FIG. 1 is a block diagram of an example of a communication system for use with one embodiment of a communication system.

While the present invention is susceptible of embodiments in various forms, there is shown in the drawings and will hereinafter be descried some exemplary and non-limiting embodiments, with the understanding that the present disclosure is to be considered an exemplification of the invention and is not intended to limit the invention to the specific embodiments illustrated. In this disclosure, the use of the disjunctive is intended to include the conjunctive. The use of the definite article or indefinite article is not intended to indicate cardinality. In particular, a reference to "the" object or "a" object is intended to denote also one of a possible plurality of such objects.

FIG. 1 is a block diagram of a specific embodiment of a communication system 100 having an automatic call distributor 109 that is part of a private branch exchange 108 in a call center 106. Calls may be connected between callers 101, 102, 103 via network 105 to the automatic call distributor 106. The automatic call distributor 106 may distribute the calls to telemarketers or agents, such as virtual agent 110, or live agent 112. The network 105 may be any appropriate communication system network such as a public switch telephone network, cellular telephone network, satellite network, land mobile radio network, the Internet, etc. Similarly, the automatic call distributor 109 may be any suitable structure including, for example, a stand-alone unit, a distributed system, integrated in a host computer, etc. The illustrated communication system 100 may be implemented under any of number of different formats. For example, where implemented in connection with a public switch telephone network, a satellite network, a cellular or land mobile radio network, embodiments of the present method and apparatus may operate within a host computer associated with the automatic call distributor and may receive voice information (such as pulse code modulation data) from a switched circuit connection which carries a voice between the callers 101, 102, 103 and the agents 110, 112.

Where embodiments of the present method and apparatus are implemented in connection with the Internet, they may operate, for example, from within a server. Voice information may be carried between the agents 110, 112 and callers 101, 102, 103 using packets.

As shown in the embodiment of FIG. 1, a caller, such as caller 101, may place a call to the call center 106. The caller 101 typically uses a station set that may, for example, be embodied as a conventional telephone, videophone or personal computer configured with appropriate telephony software and/or Internet connectivity. The call is routed via the network 105 to the call center 100, in a conventional manner. The call may be routed within the call center 106 to a private branch exchange switch 108 that has an automatic call distributor 109. The private branch exchange switch 108 and the automatic call distributor 109 may comprise conventional hardware and software, as modified herein to carry out the functions and operations of embodiments of the present method and apparatus.

In the embodiment of FIG. 1, the private branch exchange switch 108 and the automatic call distributor 109 form a switching system designed to receive calls destined for call center 100, and queue them when an appropriate agent is not available. In addition, the automatic call distributor 109 distributes calls to agents or specific groups of agents according to a prearranged scheme. The automatic call distributor 109 may be integrated with the private branch exchange 108, as in the illustrative embodiment shown in FIG. 1, or provided by a separate unit or distributed units.

Examples of the network 105, as used herein, include but are not limited to the combination of local and long distance wire or wireless facilities and switches known as the public switched telephone network, as well as cellular network systems and the Internet. The network 105 is utilized to complete calls between (i) a caller at a station set, such as callers 101, 102, 103, and the call center 100; (ii) a caller on hold and a third party; and (iii) a caller on hold and a shared-revenue telephone service, such as a 900 or 976 service, provided by content provider. As is well known, shared-revenue telephone services deliver a particular service over the telephone and subsequently bill the caller. The telephone number from which a call is made typically identifies the caller. A subsequent bill is then included as part of the caller's regular telephone bill.

The Internet network, as used herein, includes the World Wide Web (the "Web") and other systems for storing and retrieving information using the Internet. To view a web site, typically the user communicates an electronic Web address, referred to as a Uniform Resource Locator ("URL"), associated with the web site. It is noted that if the caller accesses the call center 100 from a conventional telephone, the textual portions of a premium web site may be converted to speech for presentation to the caller.

Figure 2:
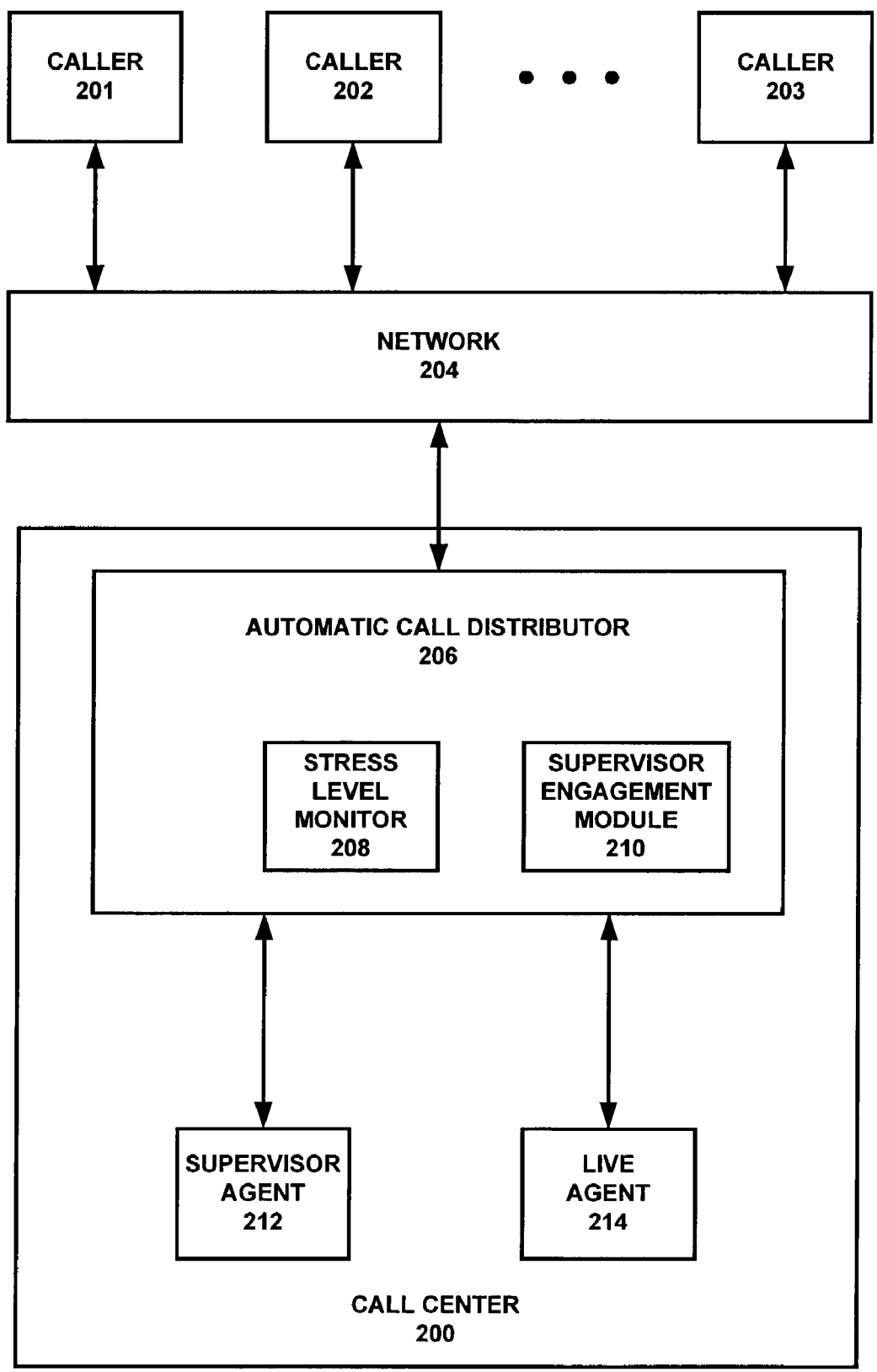
FIG. 2 depicts one embodiment of a communication system in block diagram form.

FIG. 2 is a diagram, which depicts an embodiment in a system wherein callers 201, 202, and 203 are connected via network 204 to a call center 200. The call center 200 has an automatic call distributor 206, which connects a caller, such as caller 201, to an agent 214. It is to be understood that agent 214 may be one of plurality of agents that are available within the call center 200. The automatic call distributor 206 has a stress level monitor 208, which monitors at least one of the caller 201 and agent 214. The stress level monitor 208 in the illustrated embodiment dynamically assesses respective stress levels of the parties to the call transaction. When a stress level exceeds a predetermined threshold, a supervisor engagement module 210 engages the supervisor agent 212 into the call transaction between the caller 201 and the agent 214. The supervisor agent 212, which is a third party to the call transaction, may be a virtual party or be an automated input source. A virtual agent may be software, hardware, or any combination of hardware and software that performs one or more functions of a human agent. The supervisor agent 212 may engage in the background of the call transaction (only communicating with the agent 214) or may engage in the foreground of the call transaction and communicate with both the caller 201 and agent 214.

The stress level monitor 208 may operate in substantially real-time to monitor the stress level of the caller 201 and agent 214. The stress level may be measured by voice analysis, frequency and type of eye and facial movement, body function changes (heart rate, change in breath rate, palm moisture, etc), pressure exerted by fingers on the keyboard, and other indicators of stress. Any of these could be based lined for each individual and deviations from established norms could be used as triggers to cause a supervisor to join a conversation. Typically, the tracking and baseline establishment of norms is easier for the employee being measured because the environment is controlled, but at a minimum the voice stress level tool can be deployed against the caller. The more times a caller interacts with the contact center the more data may be retained to compare against, but at a minimum the changes that may occur during a call can be tracked and evaluated. Although the stress level monitor 208 may monitor both the caller 201 and agent 214 on a continuing basis during the call transaction, a lag time may occur due to the type of monitoring algorithm used and other processing routines. Thus, the stress level monitor may monitor the parties to the call transaction in "substantially" real time, that is the respective stress levels of the parties to the transaction may be dynamically assessed in the system.

The body has two nervous systems, the central nervous system and the autonomic nervous system. The central system can be considered as concerning itself with those physical and sensory functions, which occur at, or above the threshold of awareness. The autonomic system is concerned primarily with those functions, which occur below the threshold of awareness and operates on an automatic, self-regulating basis. The beating of the heart, the rise and fall of the lungs, the digestion of food, all complex processes of the body, which must continue without any conscious effort, are functions of the autonomic nervous system.

The heartbeat, for example, normally occurs at a rate kept within certain bounds. However, under the influence of physical stress such as exertion or effort, or emotional stress, such as fear, anger, or excitement, the heart rate will change. This is called the "fight or flight syndrome." In regards to the effect on speech, which has two basic components: amplitude modulation, and frequency modulation. Amplitude modulated sound is audible, but frequency modulated sound is not. Under relaxed conditions, the human voice box is under control of the central nervous system. With the onset of stress changes occur in the voice that causes the inaudible frequency modulated component to diminish or disappear. Although normally substantially inaudible, the change can be detected. Increased stress often ultimately results in the loss of the inaudible frequency modulated signal. Since this loss can be measured, the level of stress can be determined.

Figure 3:
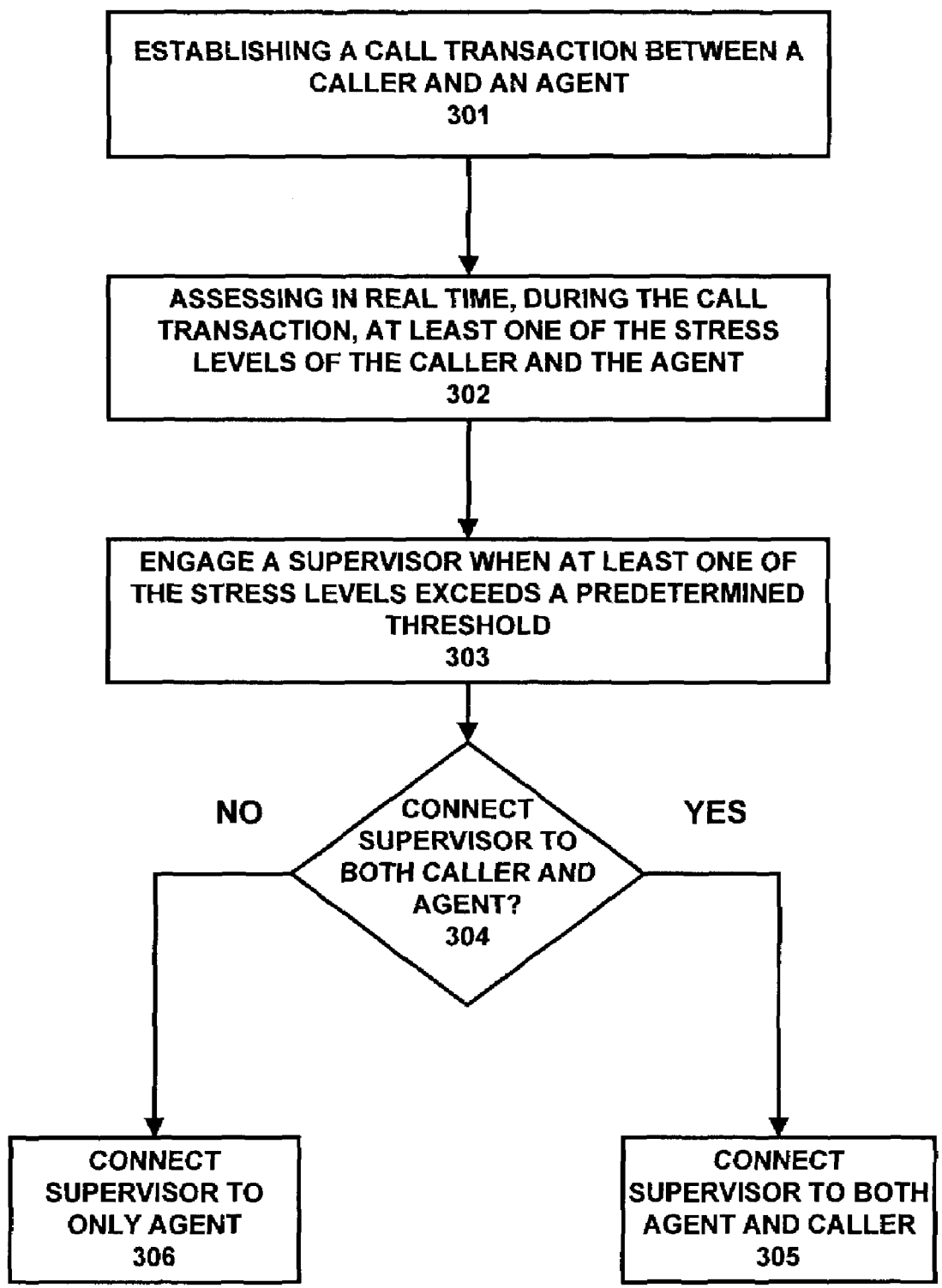
FIG. 3 is a flow diagram depicting an embodiment of a method of improving call transactions for use in a communication system.

FIG. 3 is a flow diagram depicting one embodiment of a method for improving call transactions in a communication system. Initially, a call transaction is established between a caller and an agent (first and second parties) in step 301. During the call transaction, at least one of the stress levels of a caller and agent is assessed in step 302. In one embodiment this stress assessment is performed substantially in real time. The stress measure indices as previously discussed is measured and a baseline is established in the illustrated embodiment. Deviations from the baseline may indicate a need for assistance to occur. When at least one of the stress levels exceeds a predetermined threshold, a supervisor is engaged as illustrated in step 303. Changes in the stress level being measured may be used to cause the decision to engage a supervisor. The change may be determined by using a number of different statistical models to indicate change such as percent deviation from proceeding time period or past interactions. A determination is then made as illustrated in step 304 as to whether the supervisor is to be connected one or both of the caller and agent. A physical connection may be made between the desired parties using conferencing and/or monitoring techniques currently deployed by Automatic Call Distributors and other switching fabrics such as Private Branch Exchanges or network/data routers. The typical connections may be made to allow the supervisor access to the agent only or the agent and caller simultaneously. As illustrated in step 306, the supervisor may be connected only to the agent, and in step 305, the supervisor is connected to both the agent and the caller. It is to be understood that various types of predetermined thresholds can be established. In the illustrated embodiment, in general, the predetermined threshold may be when at least one of the caller and agent have reached an emotional level that is not conducive to achieving a successful conclusion to the call transaction. When this is the case, then the supervisor agent (third party) is brought into the call transaction.

Figure 4:
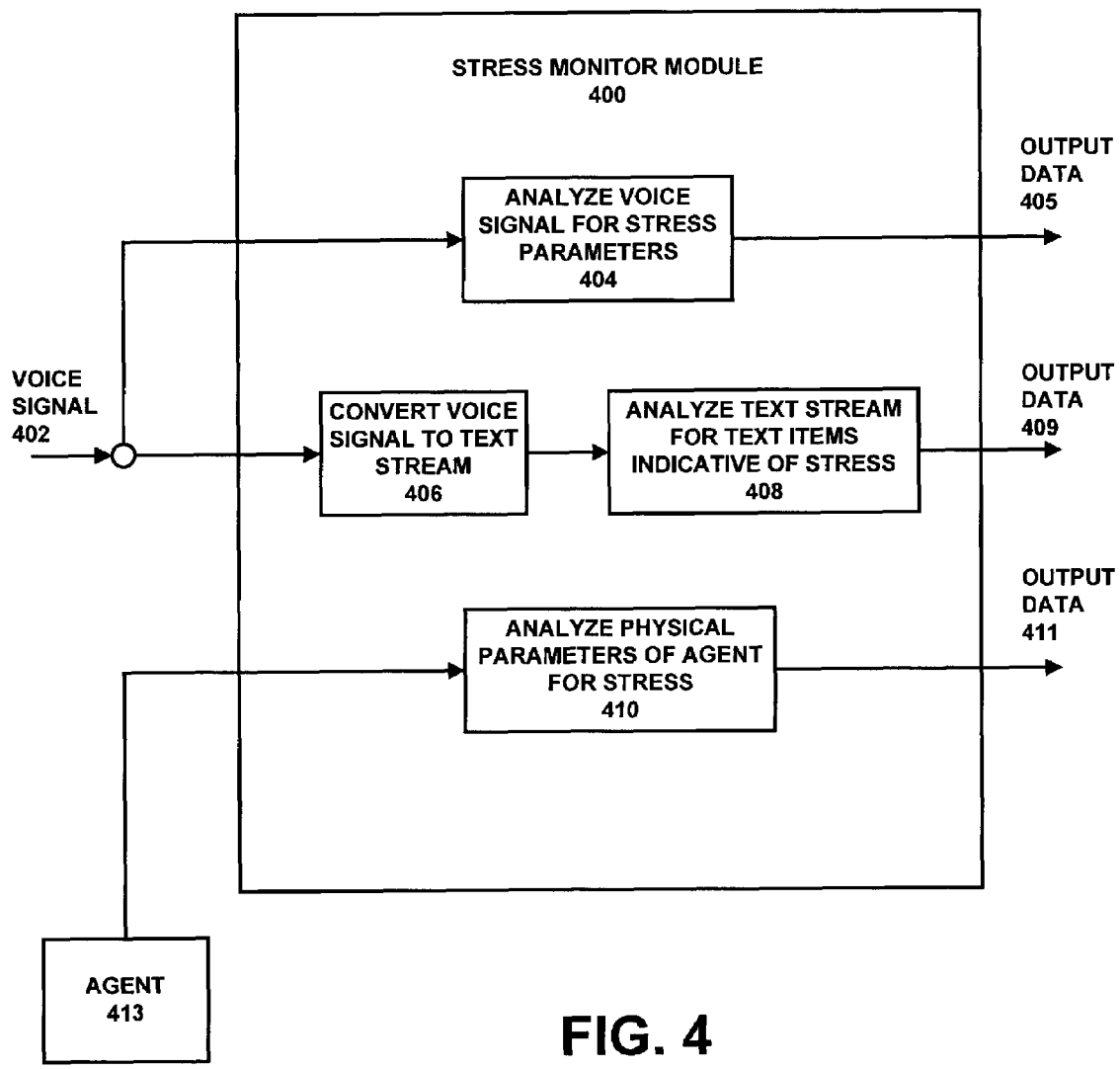
FIG. 4 is a functional diagram depicting one embodiment of a stress monitor module that may be utilized in the communication system.

FIG. 4 depicts an example of a stress monitor module 400 with three possible implementations for determining the stress levels of the parties to the call transaction. An input to the stress monitor module 400 is voice signal 402. It is to be understood that this may be the voice signal of either the caller or agent. In a module 404, the voice signal 402 is analyzed for predetermined stress parameters. The stress being measured would be modeled against various indicators of stress such as speed of speech, volume increases/decreases, frequency modulation variations, etc. This module 404 outputs data 405 indicative of the stress level in the voice signal 402. Alternatively or in addition, the voice signal 402 may be converted to a text stream in module 406 and thereafter the text stream can be analyzed for text items (words) indicative of stress in module 408. The text stream may be analyzed against key words, combination of words, sentence structure, and other non-spoken indicators of stress. The module 408 then outputs output data 409 indicative of the stress level currently in the voice signal 402. In another approach, the actual physical parameters of the agent can be analyzed for stress as illustrated by module 410. This may entail measurement of items such as eye flutter, facial movement, changes in body responses (heart rate, breath rate, skin moisture, etc.) and other measurable physical characteristics of, for example, the agent 413, who is currently a party to the call transaction. This module 410 outputs date 411 indicative of the stress level of the agent 413 in real time. Thus, it is clear that there are numerous different ways of determining the stress level(s) of the parties to the call transaction which may be used separately or in combination as illustrated by the example of FIG. 4.

Figure 5:
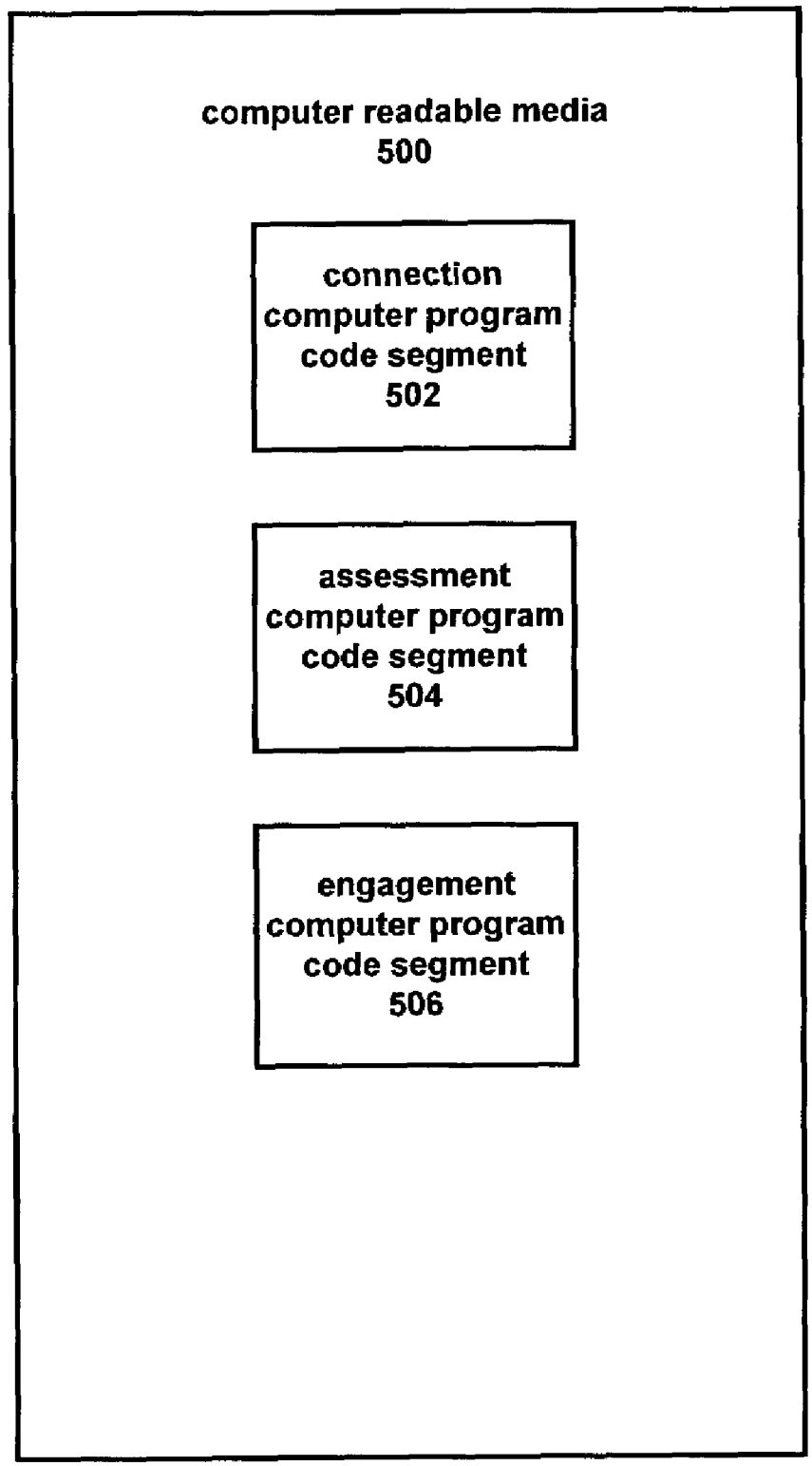
FIG. 5 is a diagnostic illustration of an example of a computer readable media with computer program code segments that implement one embodiment of the communication system.

FIG. 5 is a diagrammatic illustration which depicts an example of a computer readable media 500, which has code segments that embody embodiments of the method. The media 500 may be any recording media suitable for recording computer readable code including but not limited to CD-ROM or DVD-ROM of various types, semiconductor memory, magnetic memory, optical memory, etc. One such embodiment alternatively includes a connection computer code segment 502, which establishes a call transaction between a caller and an agent, in particular in an automatic call distribution system. An assessment computer program code segment 504 assesses a substantially real time respective stress levels of each of the caller and the agent in the call transaction. An engagement computer program code segment 506 engages a third party (e.g. supervisor, coach, etc.) into the call transaction when at least one of the stress levels of the caller and the agent exceed a predetermined threshold.

The thresholds, which may be used to determine when the third party or supervisor agent is brought into a call transaction, may be predetermined or may be programmable, for example, redefined during different time periods. In some embodiments, the present method and apparatus assist in the disposition of a call transaction by using substantially real time voice/text/physical stress analysis to dynamically assess the stress levels of first and second parties to the call transaction against these programmable thresholds that are used for determining when the supervisor agent or third party is to be engaged into the call transaction. A supervisor agent may be either a live agent and/or automated input source, such as video/data window on a workstation, environmental stimuli, or other input to the agent to introduce a reduction in the stress level. As previously stated, the supervisor agent can function as a coach either in the background or foreground of the call transaction as deemed appropriate for the situation.

It is to be understood, of course, that the present invention in various embodiments can be implemented in hardware, software, or in combinations of hardware and software.

The invention is not limited to the particular details of the example of apparatus and method depicted, and other modifications and applications are contemplated. Certain other changes may be made in the above-described apparatus and method without departing from the true spirit and scope of the invention herein involved. For example, although the invention is depicted in the environment of an automatic call distributor, the method and apparatus of the present invention can be utilized in other types of communication systems. Also for example, the present invention can be implemented in an Internet based system whereby not only can the stress levels be determined from a voice input, but also from actual video input of the parties to the call transaction. It is intended, therefore, that the subject matter in the above depictions shall be interpreted as illustrative.

What is claimed is:

1. A method for improving transactions in a communication system, comprising the steps of:

determining a base line norm of one or more voice based stress indicators for at least a first one of first and second parties in a transaction in the communication system and determining a base line norm for one or more physical stress indicators for the second party from within a controlled environment;

dynamically comparing at least one measured stress indicator of at least one of the first and second parties to a corresponding base line norm of said base line norms; and engaging a third party into the transaction when a difference between the at least one measured stress indicator of at least one of the first and second parties and said at least one corresponding base line norm exceeds a threshold deviation.

2. The method according to claim 1, wherein the third party is a virtual party.

3. The method according to claim 1, wherein the third party is an automated input source.

4. The method according to claim 1, wherein the physical stress level indicator is facial movement.

5. The method according to claim 1, wherein the difference between stress levels is a percent deviation from stress levels of an immediately preceding time period.

6. The method according to claim 1, further comprising determining whether the third party communicates only with one of the first and second parties, or both parties.

7. The method according to claim 1, wherein the physical stress level indicator is at least one of eye movement and pressure exerted by fingers on the keyboard.

8. The method according to claim 1, wherein the assessing of respective stress levels of at least one of the first and second parties is conducted substantially in real-time.

9. The method according to claim 1, wherein the comparing of respective stress levels to the base line norm of at least one of the first and second parties is conducted by at least one of; analyzing a respective voice signal of at least one of the first and second parties, converting a respective voice signal of at least one of the first and second parties to text and analyzing the text, and analyzing a physical stress level of at least the second parties.

10. The method according to claim 1, wherein the communication system is in an automatic call distribution system and wherein the steps of comparing stress levels to the base line norm further comprise assessing in substantially real-time respective stress levels of at least one of a caller and an agent in a call transaction in an automatic call distribution system.

11. The method according to claim 10, wherein the comparing of respective stress levels to the base line norm of at least one of the callers and the agent is conducted by at least one of; analyzing a respective voice signal of at least one of the callers and the agent, converting a respective voice signal of at least one of the callers and the agent to text and analyzing the text, and analyzing a physical stress level of the agent.

12. A computer program product embedded in a computer readable medium for use in a communication system, comprising:
a computer readable media containing computer program code comprising:
assessment computer program code that determines a base line norm of one or more voice based stress line indicators for at least a first one of first and second parties in a transaction in the communication system and determining a baseline norm for one or more physical stress indicators for the second party within a controlled environment;
assessment computer code that dynamically compares at least one measured indicator of at least one of the first and second parties to at least one corresponding baseline norm of said base line norms; and
engagement computer program code that engages a third party into the transaction when a difference between the at least one measured stress indicator of the first and second parties and the at least one corresponding base line norm exceeds a predetermined threshold deviation.

13. The computer program product according to claim 12, wherein the physical stress level indicator is at least one of facial movement and a change in body-function.

14. The computer program product according to claim 12, wherein the difference between stress levels is a percent deviation from stress levels of an immediately preceding time period.

15. The computer program product according to claim 12, wherein the assessing of respective stress levels of at least one of the first and second parties is conducted substantially in real-time.

16. A computer readable medium having encoded therein software for use in a communication system to perform the method comprising:
determining in substantially real-time, a base line norm of one or more respective voice based stress indicators for a caller and physical stress indicators for an agent in a call transaction in the communication system and wherein the one or more base line norms of the agent are determined in a controlled environment;
assessing in substantially real-time, respective stress indicators of each of a said caller and said agent; and
engaging a third party into the transaction when a difference between at least one of the stress indicators of at least one of the caller and the agent and said at least one corresponding base line norm of base line norms exceeds a threshold deviation.

17. The computer program product according to claim 16, wherein the third party is a virtual party.

18. The computer program product according to claim 16, wherein the physical stress level indicator is change in body function.

19. An apparatus that improves transactions in a communication system, comprising:
means for determining a base line norm of one or more stress voice based indicators for at least a first one of first and second parties in a transaction in the communication system and for determining a base line norm for one or more physical stress indicators for the second party, wherein the one or more base line norms of said one of the first and second parties is determined in a controlled environment;
dynamically comparing one ore more measured stress indicators of at least one of the first and second parties to one or more corresponding base line norms of said base line norms; and
engaging a third party into the transaction when a difference between the one or more measured stress indicators of at least one of the first and second parties and the one or more corresponding base line norms exceeds a threshold deviation.

20. The apparatus according to claim 19, wherein the third party is a means for providing a virtual party.

21. The apparatus according to claim 19, wherein the third party is a means for providing an automated input.

22. The apparatus according to claim 19, wherein the physical stress level indicator is facial movement.

23. The apparatus according to claim 19, wherein the means for assessing respective stress levels of at least one of the first and second parties is conducted substantially in real-time.

24. The apparatus according to claim 19, wherein the means for comparing of respective stress levels to the base line norm of at least one of the first and second parties further comprise at least one of, means for analyzing a respective voice signal of at least one of the first and second parties, means for converting a respective voice signal of at least one of the first and second parties to text and, and means for analyzing a physical stress level of at least the second party.

25. The apparatus according to claim 19 wherein the communication system includes an automatic call distribution system, further comprising:

automatic call transaction between a caller and an agent in the automatic call distribution system;

means for comparing in substantially real-time respective stress levels of each of the caller and the agent to the base line norm in the call transaction; and means for engaging a third party into the transaction when at least one of the stress levels of the caller and the agent exceeds a threshold deviation from said base line norm.

26. An apparatus that improves transactions in an automatic call distribution system, comprising:

a call establishing module that establishes a call transaction between a caller and an agent in the automatic call distribution system;

a memory module to store base line norms of stress level indicators obtained from the agent and the caller, where the base line norm of the agent is at least a physical stress indicator determined in a controlled environment;

a stress assessor operatively connected to the call transaction, to assess in substantially real-time respective stress levels of each of the caller and the agent in the call transaction based, in part, upon an analysis against key words, combinations of words and sentence structure; and a controller, operatively connected to the stress assessor, to engage a third party into the transaction when a difference between at least one of the stress levels of the caller and the agent and a corresponding base line norm of said base line norms exceeds a threshold.

27. The apparatus according to claim 26, wherein the third party is a virtual party.

28. The apparatus according to claim 26, wherein the third party is an automated input source.

29. The apparatus according to claim 26, wherein the stress physical level indicator is facial movement.

30. The apparatus according to claim 26, wherein the stress physical level indicator is change in body function.

31. The apparatus according to claim 26, wherein the stress assessor determines respective stress levels of the caller and the agent by at least one of;

analyzing a respective voice signal of each of the caller and the agent, converting a respective voice signal of at least one of the caller and the agent to text and analyzing the text, and analyzing a physical stress level of the agent.

* * * * *